US006979798B2

(12) United States Patent
Gu et al.

(10) Patent No.: US 6,979,798 B2
(45) Date of Patent: Dec. 27, 2005

(54) LASER SYSTEM AND METHOD FOR MATERIAL PROCESSING WITH ULTRA FAST LASERS

(75) Inventors: Bo Gu, North Andover, MA (US); Donald J. Svetkoff, Ann Arbor, MI (US); Kurt Pelsue, Wayland, MA (US)

(73) Assignee: GSI Lumonics Corporation, Northville, MI (US)

( * ) Notice: Subject to any disclaimer, the term of this patent is extended or adjusted under 35 U.S.C. 154(b) by 64 days.

(21) Appl. No.: 10/787,517

(22) Filed: Feb. 26, 2004

(65) Prior Publication Data

US 2004/0226925 A1 Nov. 18, 2004

Related U.S. Application Data

(60) Provisional application No. 60/452,708, filed on Mar. 7, 2003.

(51) Int. Cl.[7] ............................................. B23K 26/36
(52) U.S. Cl. .............................. 219/121.69; 219/121.68
(58) Field of Search ...................... 219/121.68, 121.69; 372/25

(56) References Cited

U.S. PATENT DOCUMENTS

| 5,208,437 | A | | 5/1993 | Miyauchi et al. |
| 5,235,606 | A | * | 8/1993 | Mourou et al. ............... 372/25 |
| 5,656,186 | A | | 8/1997 | Mourou et al. |
| 5,720,894 | A | | 2/1998 | Neev et al. |
| 5,998,759 | A | | 12/1999 | Smart |
| 6,025,256 | A | | 2/2000 | Swenson et al. |
| 6,057,180 | A | | 5/2000 | Sun et al. |
| 6,150,630 | A | | 11/2000 | Perry |
| 6,208,458 | B1 | * | 3/2001 | Galvanauskas et al. ..... 359/345 |
| 6,285,002 | B1 | | 9/2001 | Ngoi et al. |
| 6,286,586 | B2 | | 9/2001 | Cook |
| 6,297,541 | B1 | | 10/2001 | Ema et al. |
| 6,333,485 | B1 | | 12/2001 | Haight et al. |
| RE37,585 | E | | 3/2002 | Mourou et al. |
| 6,621,040 | B1 | * | 9/2003 | Perry et al. ............. 219/121.67 |
| 6,664,163 | B2 | | 12/2003 | Fujishima et al. |
| 6,664,498 | B2 | | 12/2003 | Forsman et al. |
| 6,717,101 | B2 | | 4/2004 | Morris et al. |
| 6,727,458 | B2 | | 4/2004 | Smart |
| 2002/0003130 | A1 | * | 1/2002 | Sun et al. ............... 219/121.68 |

FOREIGN PATENT DOCUMENTS

EP       0 902 474 A2     3/1999

OTHER PUBLICATIONS

Kruger, et al., Femtosecond-Pulse Laser Processing of Metallic and Semiconducting Thin Films, Proc. SPIE, vol. 2403, 1995, pp. 436-447.

Chichkov, et al., Femtosecond, Picosceond, and Nanosecond Laser Ablation of Solids, Applied Physics, A 63, 1996, pp. 109-115.

Stuart, et al., Ultrashort-Pulse Optical Damage, Proc. SPIE, vol. 2714, 1996, pp. 616-629.

(Continued)

Primary Examiner—Geoffrey S. Evans
(74) Attorney, Agent, or Firm—Brooks Kushman P.C.

(57) ABSTRACT

Laser system and method for material processing with ultra fast lasers are provided. One aspect of the invention features the method which removes at least a portion of a target structure such as a memory link while avoiding undesirable damage to adjacent non-target structures. The method includes applying a single ultra short laser pulse to the target structure to remove the target structure with the single pulse.

27 Claims, 9 Drawing Sheets

OTHER PUBLICATIONS

Haight, et al., Implementation and Performance of a Femtosecond Laser Mask Repair System in Manufacturing, 1998, pp. 1-8.

Islam, et al., On Ultrashort Laser Pulse Machining, Technical Report, 1998.

Zhao, et al., Micromachining with Ultrashort Laser Pulses, Proc. SPIE, vol. 3618, 1999, pp. 114-121.

Zhu, et al., Influence of Laser Parameters and Material Properties on Micro-Drilling with Femtosceond Pulses, Applied Physics A69 (Suppl), 1999, 367-S371.

Tonshoff, et al., Micromachining Using Femtosecond Lasers, LPM 2000 Conference, Japan, Jun. 2000, pp. 1-15.

Perry, et al., Ultrashort-Pulse Laser Machining, LIA Handbook of Laser Materials Proceesing, Ed. In Chief Ready, Laser Institute of America, 2001, pp. 499-508.

Perry, et al., Ultrafast Lasers for Material Processing, LIA Handbook of Laser Materials Processing, Ed. In Chief Ready, Laser Institute of America, 2001, p. 82.

Liu, Xinbing, et al., Ultrashort Laser Pulses Tackle Precision Machining, Laser Focus World, Aug. 1997.

Jandeleit, J., et al., Picosceond Laser Ablation of Thin Copper Films, Applied Physics A 63, 1996, pp. 117-121.

Stuart, B.C., et al., Optical Ablation By High-Power Short-Pulse Lasers, Optical Society of America, vol. 13, No. 2, Feb. 1996, pp. 459-468.

Ameer-Beg, S., et al., Femtosecond Laser Microstructuring of Materials, Applied Surface Science 127-129, 1998, pp. 875-880.

Sucha, Gregg, Doped Optical Fibers Promise Compact Femtosecond Sources, Laser Focus World, 1998, pp. 1-4.

Nolte, S., et al., Ablation of Metals by Ultrasort Laser Pulses, Optical Society of America, B/vol. 10, Oct. 1997, pp. 2716-2722.

Kautek, Wolfgang, et al., Femtosecond Pulse Laser Ablation of Metallic, Semiconducting, Ceramic, and Biological Materials, SPIE vol. 2207, pp. 600-611.

Corkum, P.B., et al., Thermal Response of Metals to Ultrashort-Pulse Laser Excitation, The America Physical Society, Dec. 19, 1988, vol. 61, No. 25, pp. 2886-2889.

Liu, Hsiao-Hua, et al., Effects of Wavelength and Doping Concentration on Silicon Damage Threshold, pp. 1-2.

Korte, F., et al., Nanostructuring With Femtosecond Laser Pulses, CLEO, 2000, pp. 374.

* cited by examiner

LASER SYSTEM AND METHOD FOR MATERIAL PROCESSING WITH ULTRA FAST LASERS

CROSS REFERENCE TO RELATED APPLICATION

This application claims the benefit of U.S. provisional application Ser. No. 60/452,708, filed Mar. 7, 2003.

BACKGROUND OF THE INVENTION

1. Field of the Invention

The present invention relates to laser processing of materials such as semiconductor redundant memory links and, in particular, to a laser system and method utilizing a single laser pulse having an ultra short pulse width to process target material such as to sever a memory link. The present invention is also applicable to other laser-based micro-machining and repair operations. For example, the invention may be adapted for removing microscopic target material while avoiding undesirable damage to adjacent non-target material(s) having a thermal or optical property different than the target material.

2. Background Art

The following exemplary publications are related to micro-machining with ultrashort laser pulses:
1. Kruger et al., "Femtosecond-Pulse Laser Processing of Metallic and Semiconducting Thin Films," PROC. SPIE, Vol. 2403, pp. 436–447, 1995.
2. Chichko et al., "Femtosecond, Picosecond, and Nano-second Laser Ablation of Solids," APPLIED PHYSICS, A 63, 109–115, 1996.
3. Stuart et al., "Ultrashort-Pulse Optical Damage," PROC. SPIE, Vol. 2714, pp. 616–629, 1996.
4. Haight et al., "Implementation and Performance of a Femtosecond Laser Mask Repair System in Manufacturing," pp. 1–8, IBM, 1998.
5. Islam et al., "On Ultrashort Laser Pulse Machining," TECHNICAL REPORT, 1998.
6. Zhao et al., "Micromachining with Ultrashort Laser Pulses," PROC. SPIE, Vol. 3618, pp. 114–121, 1999.
7. Zhu et al., "Influence of Laser Parameters and Material Properties on Micro-Drilling with Femtosecond Pulses," APPLIED PHYSICS A69 [Suppl], 367–S371, 1999.
8. Tonshoff et al, "Micromachining Using Femtosecond Lasers," LPM 2000 CONFERENCE, June 2000.
9. Perry et al., "Ultrashort-Pulse Laser Machining," LIA HANDBOOK OF LASER MATERIALS PROCESSING, Ed. In Chief Ready, Laser Institute of America, pp. 499–508, 2001.
10. Perry et al., "Ultrafast Lasers for Material Processing," LIA HANDBOOK OF LASER MATERIALS PROCESSING, Ed. In Chief Ready, Laser Institute of America, p. 82, 2001.

Reference 4 to Haight et al. specifically relates to application of ultrashort technology for repair of chromium defects on a photomask, an example of a laser repair application in microelectronics.

The following exemplary U.S. patents and published applications relate to micromachining with ultrashort laser pulses:
1. U.S. Pat. No. 5,656,186, "Method for Controlling Configuration of Laser Induced Breakdown and Ablation."
2. U.S. Pat. No. 6,285,002, "Three Dimensional Micro-Machining with a Modulated Ultra-short Laser Pulse."
3. U.S. Pat. No. 6,286,586, "Method and Apparatus for Improving Quality and Efficiency of Ultrashort-Pulse Machining."
4. U.S. Pat. No. 6,333,485, "Method for Minimizing Sample Damage During Ablation of Material Using a Focused Ultrashort Pulsed Beam."
5. Published U.S. patent application Ser. No. 2002/0003130, "Laser System and Method for Processing a Memory Link with a Burst of Laser Pulses Having Ultrashort Pulse Widths."

The '485 patent specifically relates to application of ultrashort technology for repairing chromium defects on a photomasks, an example of a laser repair application in microelectronics. The '3130 published application is related to semiconductor laser memory repair.

Exemplary specifications for next generation DRAM devices include link widths less than 0.5 microns and the link pitch (spacing) less than 2 microns (e.g., 1.33 microns or as fine as about 1 micron). Current commercial laser memory link repair systems, which typically use Q-switched, Nd: based solid state lasers with wavelengths of 1 to 1.3 microns and pulse widths 4 to 50 nsec, are rapidly approaching limits. The large spot size due to the wavelength used and thermal effect due to the pulse width used are two limiting factors.

Solutions using short wavelength lasers have been proposed, for instance green (e.g.: 532 nm wavelength typical) and solid state UV lasers (e.g.: 355 nm, 248 nm, and shorter). U.S. Pat. Nos. 6,057,180 and 6,025,256 describe methods of using a nano-second UV laser to sever the links. Although the short wavelength has the benefit of a smaller beam spot size, the relative long pulse width of these conventional lasers makes the thermal process dominant. The chances of Silicon substrate damage at the shorter wavelengths greatly increases. Further, the size and the pitch of the links to be processed become limited as a result of neighbor link damage. The tolerance budget of the laser system as a whole must be considered so as to produce acceptable yields at the fine pitch scale. Material modifications and/or the introduction of shielding layers have been proposed, for instance as disclosed in U.S. Pat. Nos. 6,057,180; 6,297,541; and 6,664,163 and EP patent application No. 0902474. Approaches have been proposed to reduce collateral damage (adjacent link damage).

U.S. Pat. No. 5,656,186 discloses a general method of laser-induced breakdown and ablation by ultra fast laser pulses. It describes the dependence of the fluence threshold on laser pulse width. The slope of such dependence will show a rapid change from the typical square root relationship when the pulse width is less than the so-called breakdown point pulse width. For metals, the breakdown point is typically around 10 ps, but may vary from an exemplary range of hundreds of femtoseconds to tens of picoseconds.

U.S. Pat. No. 5,208,437 discloses the use of a single pulse to process the link with a pulse width less than 1 nsec. However, the existence of the break down point, as indicated in U.S. Pat. No. 5,656,186, is not disclosed.

Numerous references teach using ultra fast lasers for micro-machining at low pulse energies, low peak energy densities, and low peak power densities that are close to ablation threshold. The etching rates per pulse are comparable to the depth of the optical absorption.

An application of ultrashort processing to link blowing is disclosed in published U.S. patent application Ser. No. 2002/000313. Links are to be processed by applying a pulse train of ultra short laser pulses to each link at very high repetition rates. Etching rates per pulse are in the range of 0.01–0.03 microns per pulse for link material removal, and typically between 0.01 to 0.2 microns per pulse to remove a layer of passivation material. Multiple pulses or pulse trains are required to sever a link that is 0.05 microns or thicker. Therefore, multiple pulses are also needed to remove the memory redundancy link that is more than 0.4 micron thick.

SUMMARY OF THE INVENTION

An object of the present invention is to provide a method and apparatus for improving the quality of laser processing of microstructures such as memory links.

Another object of the present invention is to provide a method and apparatus for laser processing of microstructures such as ultra fine pitch memory links.

One aspect of an embodiment of the invention features a method of removing at least a portion of a target structure while avoiding undesirable damage to adjacent non-target structures including applying a single ultra short laser pulse to the target structure to remove the target structure with the single pulse.

Another aspect of an embodiment of the invention features a system for carrying out the above method.

In carrying out the above aspects and other aspects of the present invention, a method for processing target material of a microstructure while avoiding undesirable changes to adjacent non-target material having a thermal or optical property different than the target material is provided. The target material is characterized by a relationship of fluence breakdown threshold versus laser pulse width that exhibits a rapid and distinct change in slope at a characteristic laser pulse width. The method includes generating a pulsed laser beam in which a first pulse of the beam has a pulse width equal to or less than the characteristic laser pulse width. The pulsed laser beam is focused to obtain a focused beam. The method further includes relatively positioning the focused beam into a spot on the target material wherein the first pulse removes all of the target material while avoiding undesirable change to the adjacent non-target material.

The microstructure may be a electrically conductive, redundant memory link.

The link may be supported on a silicon substrate, and the laser wavelength may be greater than about 1 $\mu$m.

The step of generating may include amplifying a seed pulse with a fiber optic amplifier.

At least one absorbing material may be located between the link and the substrate to prevent damage to at least one of the substrate and a link adjacent to the memory link.

The at least one absorbing material may include a sacrificial layer of material.

Energy density of the focused beam at the spot may be greater than about 2 Joules/cm$^2$.

The energy density may be in a range of about 25–30 Joules/cm$^2$.

The pulse width of the first pulse may be less than about 10 ps.

The spot may have a diameter less than about 1.6 microns.

The link may be part of a semiconductor memory device having links widths pitch less than about 1.33 microns.

Interaction of the absorbing material with the focused beam may include non-linear absorption of laser energy.

The microstructure may be a link supported on a substrate, and at least one sacrificial material may be located between the link and the substrate.

The substrate may be a silicon substrate.

Laser wavelength may be less than about 500 nm.

The pulse width of the first pulse may be less than about 150 fs.

Further in carrying out the above aspects and other aspects of the present invention, a system for processing target material of a microstructure while avoiding undesirable changes to adjacent non-target material having a thermal or optical property different than the target material is provided. The target material is characterized by a relationship of fluence breakdown threshold versus laser pulse width that exhibits a rapid and distinct change in slope at a characteristic laser pulse width. The system includes means for generating a pulsed laser beam in which a first pulse of the beam has a pulse width equal to or less than the characteristic laser pulse width. The system also includes means for focusing the pulsed laser beam to obtain a focused beam, and means for relatively positioning the focused beam into a spot on the target material wherein the first pulse removes all of the target material while avoiding undesirable change to the adjacent non-target material.

The microstructure may be an electrically conductive, redundant memory link.

The means for generating may include an oscillator to generate a source pulse, a pulse stretcher to stretch the source pulse to obtain a stretched pulse, an optical amplifier for amplifying the stretched pulse to obtain an amplified pulse, and a compressor for compressing the amplified pulse so as to produce the first pulse.

The means for relatively positioning may includes a positioning subsystem for relatively positioning the link and the focused beam.

The optical amplifier may be a fiber optic amplifier.

The pulse stretcher and the compressor may both be gratings.

The optical amplifier may be an all-fiber parabolic pulse amplifier.

The means for generating may include an oscillator and an optical amplifier, and the oscillator and the optical amplifier may both be fiber-based.

The means for generating may use chirped pulse amplification, or may use parabolic pulse amplification.

The means for generating may use fiber chirped pulse amplification (FCPA).

Additional objects, aspects, and advantages of this invention will be apparent from the following detailed description of preferred embodiments thereof which proceeds with reference to the accompanying drawings.

DETAILED DESCRIPTION OF THE PREFERRED EMBODIMENTS

Overview

An aspect of an embodiment of the invention includes a method of removing a target structure while avoiding undesirable damage to adjacent non-target structures including applying a single ultra short laser pulse to the target structure to remove the target structure with the single pulse.

Another aspect of an embodiment of the invention includes a method of removing an electrically conductive redundant memory link supported on a substrate. The method includes generating a pulsed laser beam having a pulse width less than about a characteristic pulse width corresponding to a breakdown point of the link material. The material is characterized by a relationship of fluence breakdown threshold versus laser pulse width that exhibits a rapid and distinct change in slope at the characteristic laser pulse width. The method also includes focusing the laser beam into a spot having a location wherein the energy density is substantially greater than a fluence threshold, and irradiating a link at the location so that the link is removed with a single pulse of the pulsed laser beam.

The substrate may be silicon, and the laser wavelength may be greater than about 1 $\mu$m. The method may include generating a pulse may include amplifying a seed pulse with a fiber optic amplifier.

The substrate may be silicon, the laser wavelength may be less than about 1 $\mu$m, and the device may include at least one absorbing material located between the link and the substrate to prevent damage to at least one of the substrate and an adjacent link.

The energy density may be greater than about 2 Joules/cm$^2$, and may preferably be in a range of about 25–30 Joules/cm$^2$.

The pulse width may be less than about 10 ps.

The spot may have a diameter less than about 1.6 microns.

An aspect of an embodiment of the invention includes a laser based system for carrying out the above method. The system includes a pulsed femtosecond laser source, a pulse stretcher, and an optical amplifier for amplifying the stretched pulse. The system also includes a compressor for compressing the amplified pulse so as to produce an ultrashort output pulse having a pulse width less than about the characteristic pulse width, an optical system for applying the ultrashort pulse to the link, and a positioning system for relatively positioning the link and the laser pulse.

The amplifier may be a fiber optic amplifier.

The stretcher and compressor may both be gratings.

The optical amplifier may be an all-fiber parabolic pulse amplifier.

The oscillator and amplifier configurations may both be fiber-based.

Numerous embodiments include fiber-based lasers or amplifiers. However, various embodiments may also include diode-pumped solid state lasers, microchip lasers, or possibly disk lasers.

Laser Parameters and Link Removal

In at least one embodiment of the invention a memory redundancy link is severed with a single, ultra fast laser pulse by providing fluence at the target location which is much higher than the link ablation threshold.

The present invention employs an ultra fast laser to sever a memory redundancy link, instead of using multiple nanosecond laser pulses of conventional link processing systems. The pulse width is generally below the approximate characteristic threshold of the target material, the breakdown point pulse width. The pulse width is typically less than 10 ps, preferably less than 130 fs. However, it is to be recognized that a breakdown point may vary over an exemplary of several hundred femtoseconds to tens of picoseconds, depending upon the material.

In order to achieve the single shot processing of links, for example aluminum links, the range of the peak energy density is about 2 J/cm$^2$ to 250 J/cm$^2$, with a typical value around 25–30 J/cm$^2$. The range of peak power density is $1 \times 10^{13}$ w/cm$^2$ to $2 \times 10^{15}$ w/cm$^2$, with a typical value around $2 \times 10^{14}$ w/cm$^2$. For a laser pulse width of 120 fs and wavelength of 800 nm, and focused spot size of 1 micron in diameter, an exemplary 0.5 micron thick aluminum link with a 0.4 micron thick passivation overlayer is removed by a single laser pulse with a pulse energy around 0.2 micro joules. This etch rate cannot be explained by the optical absorption depth. It is caused by the so-called ballistic electron transport which leads to the incident energy being absorbed over a greater depth.

In at least one embodiment of the invention, the spot size may be optimized with the use of an optical system having one or more reflective components. For instance, the objective lens system may include a diffraction-limited reflective system. Various components are well suited to control dispersion effects in ultra short systems and are commercially available from Femto Laser, Inc. (femtolaser.com).

The ultra fast laser process greatly reduces thermal effects and an undesirable heat affected zone can therefore be minimized or eliminated. This makes it possible for lasers to process memory links with finer pitches where the thermal effect is a major factor. Links with pitches as low as 1 micron can be processed using at least one embodiment of the present invention.

When the pulse widths of laser pulses are equal to or shorter than the breakdown point pulse width, the laser material processing will have significantly reduced thermal characteristics compared to laser pulses of longer pulse widths (U.S. Pat. No. 5,656,186). For example, for most metals, this breakdown pulse width is about 10 ps.

By conducting a study on severing memory links with ultra fast lasers, it was determined that the larger etching rates per pulse can be achieved, thus, a single pulse process of severing a link of 0.05 microns or thicker is possible, with the exemplary laser parameters above.

The single shot link blowing process may be applied to numerous memory structures and materials. For instance, the links may have one or more passivation layers between the incident beam and the link. Similarly, there may be one or more metal or dielectric layers between the link and substrate. Additional margin, so to avoid substrate damage or collateral link damage, may be provided for fine pitch by the shielding layers or other material modification, for instance as disclosed in U.S. Pat. Nos. 6,057,180; 6,297,541; and 6,664,173 and EP published application No. 0902474, and published U.S. application Ser. No. 2002/0017662. Link materials may be aluminum, copper, gold, polysilicon or other suitable materials.

A sacrificial layer may be disposed between the link and substrate or between the links to exploit non-linear absorption effects due to high peak power and power density generated with the ultra short pulse laser. The material of the sacrificial layer can be transparent under the conventional nanosecond laser pulses, and therefore, may generally not be suitable as the material for the shield layer as disclosed in U.S. Pat. Nos. 6,057,180; 6,297,541; and 6,664,174 and EP published application No. 0902474 and published U.S. application Ser. No. 2002/0017662. The sacrificial materials disclosed herein can be any suitable dielectric, conductor, or semiconductor material. In particular, they can be part of the normal dielectric materials (for example, $SiO_2$ and $Si_3N_4$) used in DRAMs or other memory devices so that no special or additional fabrication process is required. This is one of the advantages of this type of sacrificial layer. Another advantage is that it gives rise to a much larger link blowing process window because the sacrificial layer allows a high dose of energy and/or pulses to be used to cleanly remove links without damage either to the underlying substrate or to the adjacent link structures.

Zhao et al. (see reference 6) teaches precision micromachining (drilling) of holes in samples of aluminum, silicon, and fused silica at various wavelengths, including single shot ablation results. It was recognized that effective ablation should occur at 800 nm (e.g.: Ti:Sapphire laser) due to the near Infrared spectral absorption peak of Aluminum. Embodiments of the present invention may operate with wavelengths in the near infrared, visible, or ultraviolet regions. For link processing in the near IR, it is desirable to operate at a shortest possible wavelength so as to achieve a small spot size (as taught in U.S. Pat. No. 5,998,759, assigned to the assignee of the present invention). It is to be recognized that the absorption of Silicon increases rapidly for wavelengths less than the absorption edge. For near IR link removal, it is contemplated that a wavelength of about 1 $\mu$m, where it is recognized that silicon is weakly absorbing, may be beneficial for processing metal links. For instance, a laser output from a fiber based system at 1.03 $\mu$m or 1.064 microns may preferably be used, or perhaps a wavelength of about 980 nm.

Ultra Short Laser Embodiments

Preferred laser wavelengths may be 1.3, 1.18, 1.09, 1.064, 1.053, or 1.047, microns from Neodymium (Nd) doped solid state lasers (Nd:YAG, Nd:YLF, Nd:YVO4) or other rare earth elements (e.g., ytterbium(Yb), neodymium (Nd), erbium (Er)) doped fiber lasers. To achieve smaller spot sizes and larger focal depths, preferred laser wavelengths can also be the second, third, fourth, and fifth harmonics of these and other lasers. For example, laser sources with laser wavelengths in the uv (e.g., 355 nm from the third harmonic), in the visible (e.g. 532 nm from the second harmonic), and in the near IR (e.g., 700–900 nm) range can also be used. One such a laser system is a Ti:sapphire ultra fast laser which produces laser pulses with pulse widths ranging from 50 to 150 fs in the 750 to 850 nm range. Another is the rare earth element doped fiber laser that gives wavelength around 800–980 nm.

At least one embodiment of the present invention includes the use of an oscillator (seed) and amplifier configuration to obtain the necessary ultra fast laser pulse energy to sever a memory redundancy link in a single pulse instead of using a multiple laser pulses or pulse trains.

Embodiments of the present invention may include either Chirped Pulse Amplification (CPA) or Parabolic Pulse Amplification (PPA) techniques in the amplifier. Fiber chirped pulse amplification (FCPA) may be utilized.

One of the preferred embodiments includes an all fiber laser system to obtain ultra fast laser pulses.

Figure 1:
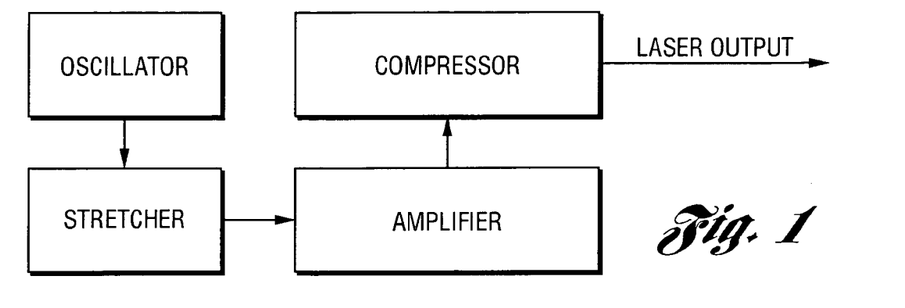
FIG. 1 is a schematic diagram of an ultra fast laser system using chirped pulse amplification (CPA)

FIG. 1 shows a schematic diagram of an ultra fast laser system using chirped pulse amplification (CPA). Limited by laser media and optics damages, and unwanted nonlinear effects due to high peak energy density, an oscillator of the ultra fast laser may not generate enough pulse energy to allow higher etching rates. One solution is to use chirped pulse amplification (CPA) in an oscillator/amplifier configuration. (See, for example, the reference: D. Strickland, G. Mourou, "Compression of Amplified Chirped Optical Pulses," OPT. COMM., Vol. 56, pp. 219–221, 1985.) The oscillator can be a low power ultra fast laser. The stretcher can be a pair of gratings. The amplifier can be another solid-state laser or fiber laser. Finally, the compressor can be a pair of transmission gratings available from a number of manufacturers.

Figure 2:
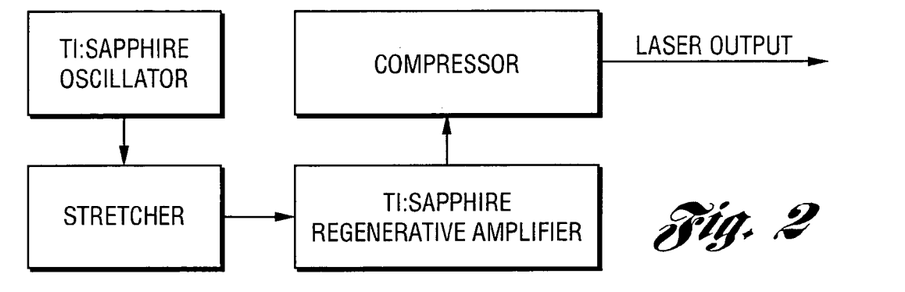
FIG. 2 is a schematic diagram of an ultra fast Ti:sapphire laser system using Chirped Pulse Amplification (CPA)

An example of a laser system using CPA is shown schematically in FIG. 2. An ultra fast Ti:sapphire oscillator and amplifier system is used to obtain the pulse energy required based on the CPA technique. Exemplary lasers are: For the Ti:sapphire oscillator, Mai Tai by Spectra Physics. It is a mode-locked Ti:sapphire laser that has 1.5 watts at 800 nm with a pulse width less than 100 fs. One Ti:sapphire regenerative amplifier and Stretcher/Compressor, is known as "Spitfire" (made by Positive Light Inc.) It has a grating based stretcher/compressor assembly that produces ultra short pulse widths. The amplifier gives 1 mJ at 1 KHz with pulse widths 80–130 fs. Data sheets for both Mai Tai and Spitfire are available from Spectra-Physics.

Figure 3A:
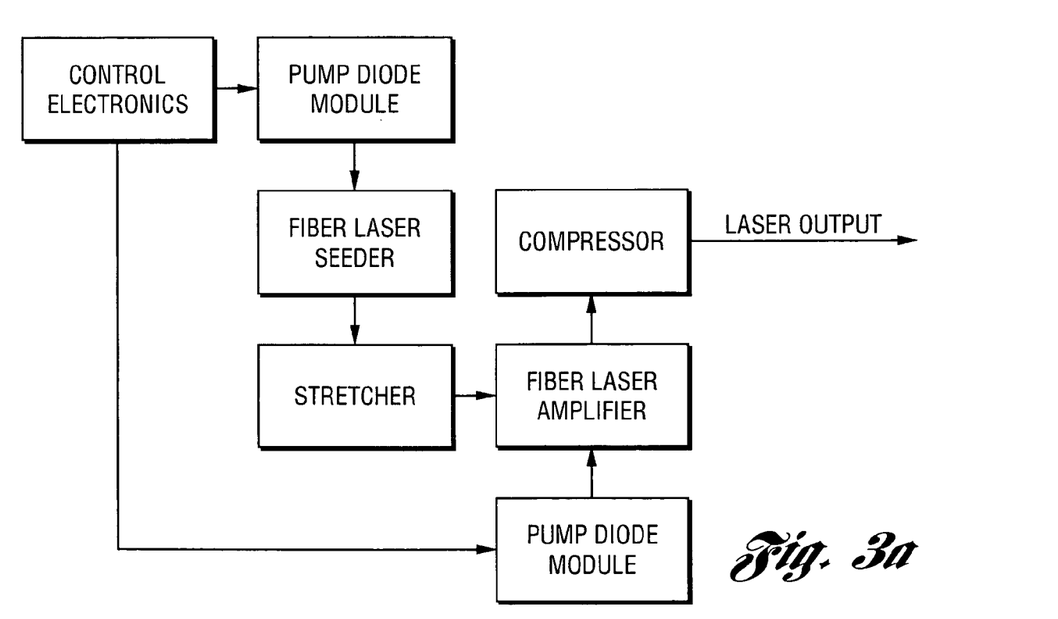
FIG. 3a is a schematic diagram of one laser configuration that can be employed in accordance with the present invention; it is an all fiber laser system.
Figure 3B:
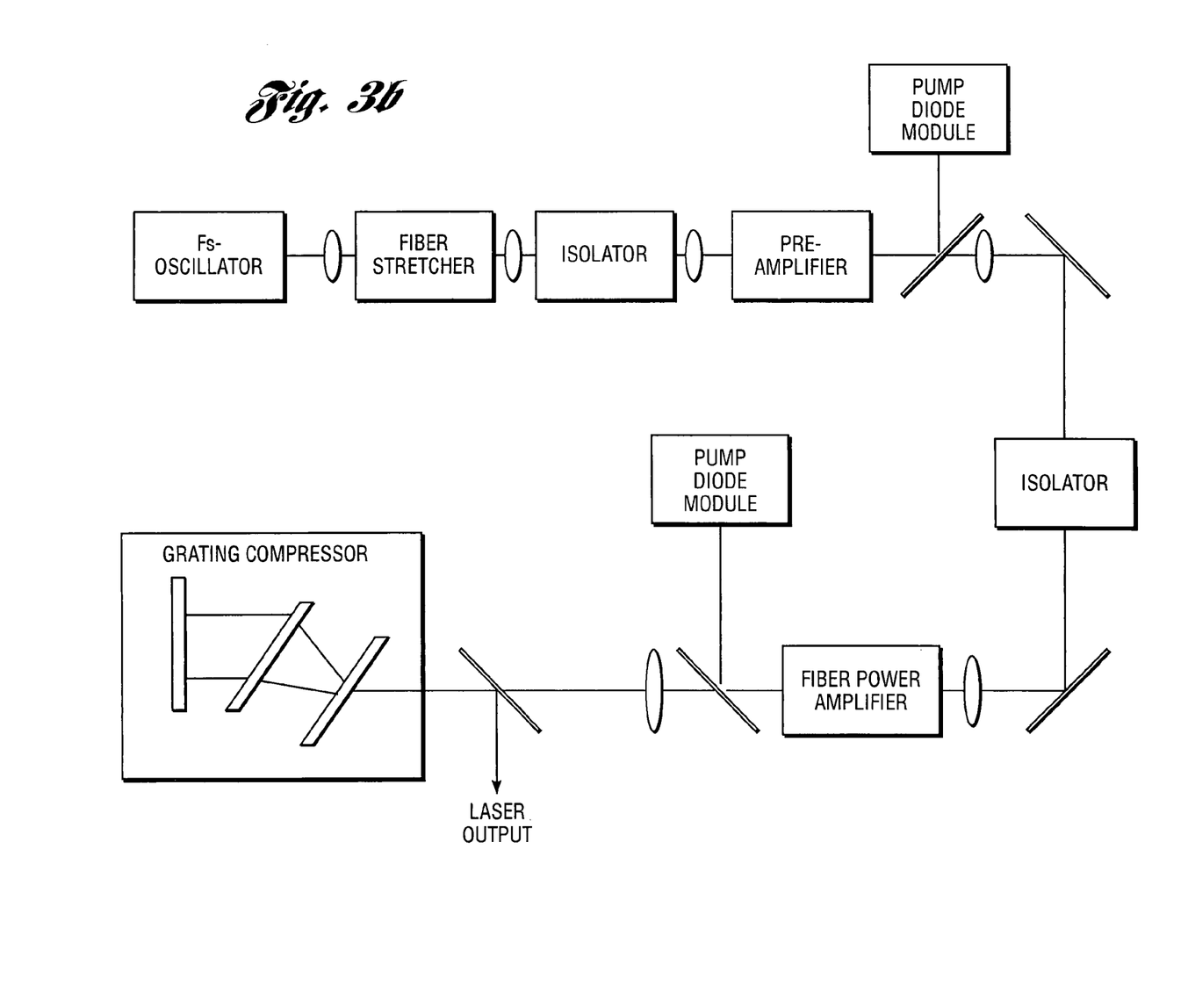
FIG. 3b is a schematic diagram of an exemplary fiber-based CPA system.

FIG. 3a shows a block diagram of an all fiber laser system. A chirped pulse amplification (CPA) technique is used to amplify the pulse energy to reach the energy and power levels with the short pulse width that are required to obtain the single pulse process. Both seed laser and amplifier laser are fiber lasers. Potential advantages of using fiber lasers include compactness, excellent beam quality and control, ease in thermal management, and maintenance-free. A more detailed layout is shown in FIG. 3b. The system consists of a fiber-based ultra short pulse seed laser, a short length of a fiber for stretching the pulses, and a fiber based pre-amplifier (optional) and a fiber based power amplifier. Isolators are used at different stages to prevent back reflections. All fiber based laser systems are pumped by diodes. Finally, a pair of gratings is used as a compressor to reduce the pulse width to fs range.

Figure 6:
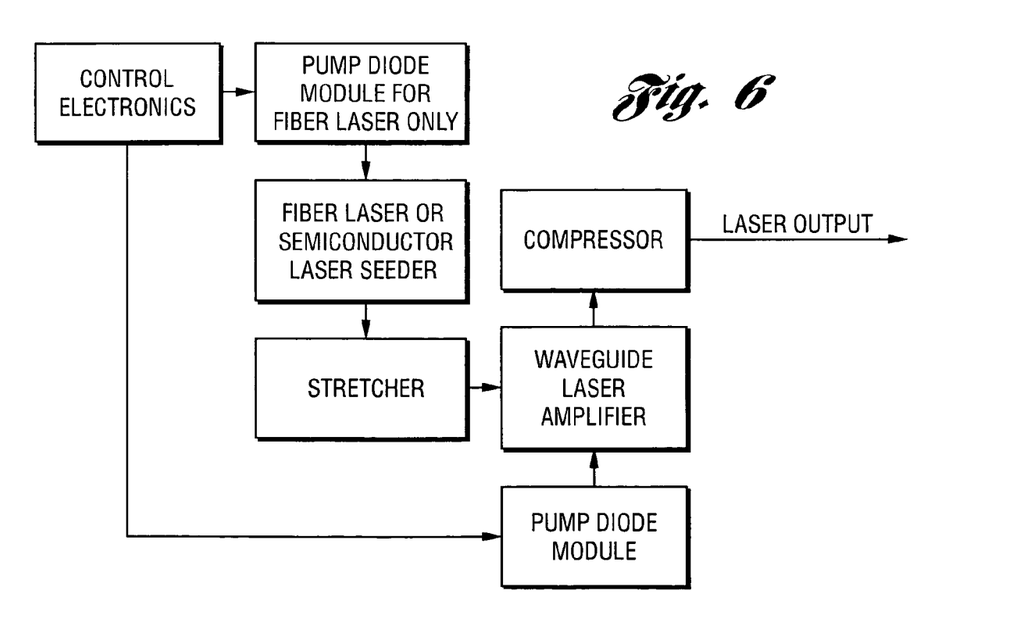
FIG. 6 is a schematic diagram of another laser configuration that can be employed in accordance with the present invention.

U.S. Pat. No. 5,696,782 (issued 1997) shows an exemplary ultra fast fiber based system. FIG. 6 of the '782 patent shows a fast tuned laser diode, fiber pre-amplifier, and a double pass power amplifier with a pumping sub-system, compressor, and associated optics for beam management.

Figure 7:
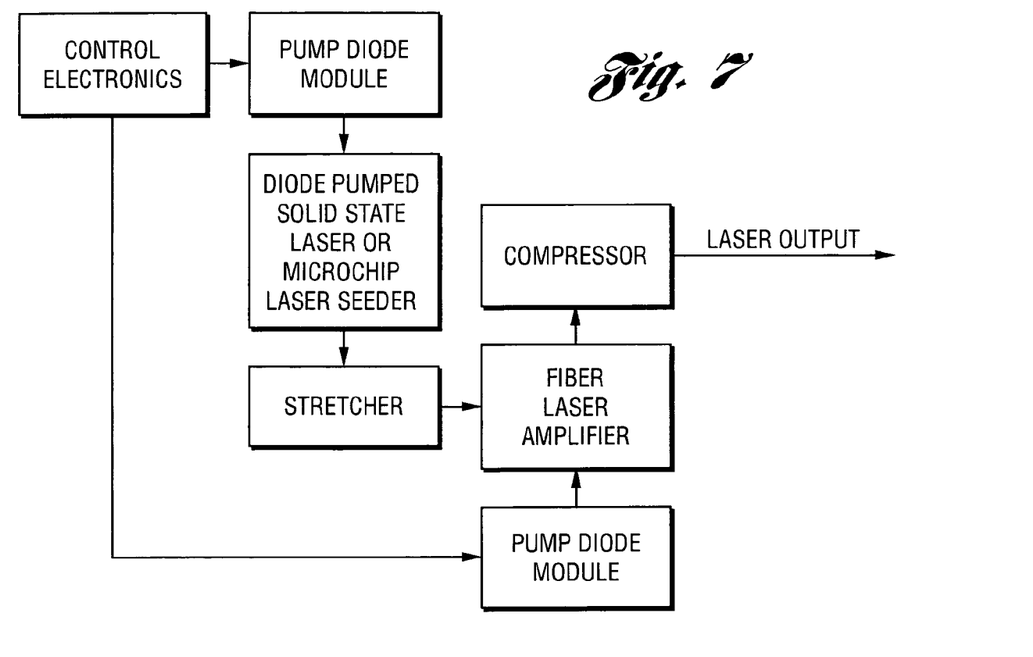
FIG. 7 is a schematic diagram of another laser configuration that can be employed in accordance with the present invention.

Fiber chirped pulse amplification (FCPA) may be carried out in a fiber-based system. Examples include a fiber-based grating structure, chirped fiber Bragg gratings, and chirped quasi-phase-matched gratings. (See U.S. Pat. Nos. 5,696,782; 6,181,463; 6,198,568; and 6,208,458.) FIG. 7 of the '782 patent shows FCPA components in an ulstrashort fiber system.

An exemplary laser can also be found in the following reference Gregg Sucha et al., "Femtosecond Fiber Lasers Hit Power Highs," LASER Focus WORLD, August, 2000. A Yb-fiber-based ultra short pulse seed laser is used. The seed laser operates at 1055 nm and delivers 2-ps pulses at a repetition rate of 50 MHz at an average power of 300 mw. The seed laser pulses are linearly chirped and have a bandwidth of approximately 20 nm. The power amplifier consists of a 4.3-meter length of Yb-doped fiber. It is pumped by laser diodes at 976 nm. The amplified pulses are recompressed down to 100 fs after passing through a conventional diffraction grating compressor at an output wavelength of 1055 nm.

Figure 3C:
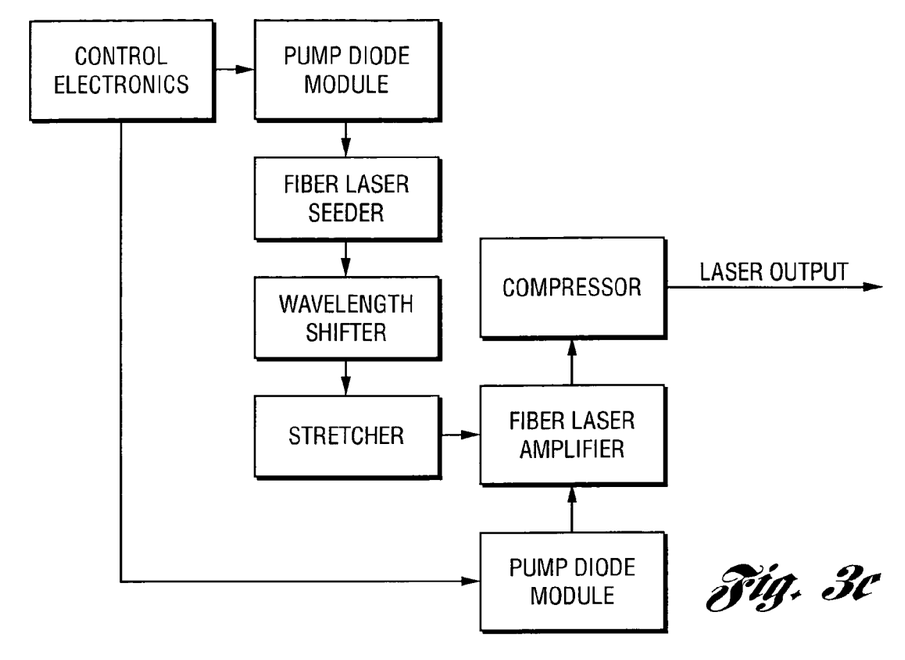
FIG. 3c is a schematic diagram of another laser configuration that can be employed in accordance with the present invention; it is an all fiber laser system.

FIG. 3c shows a schematic diagram of another all fiber laser system. In this case, the seed laser wavelength is not the same as that of the power amplifier. Wavelength shifting is to be used to shift the wavelength from the seed laser to the wavelength of the power amplifier. The examples of the wavelength shifter include Raman shifter, frequency up conversion or down conversion, frequency doubling, etc.

Figure 3D:
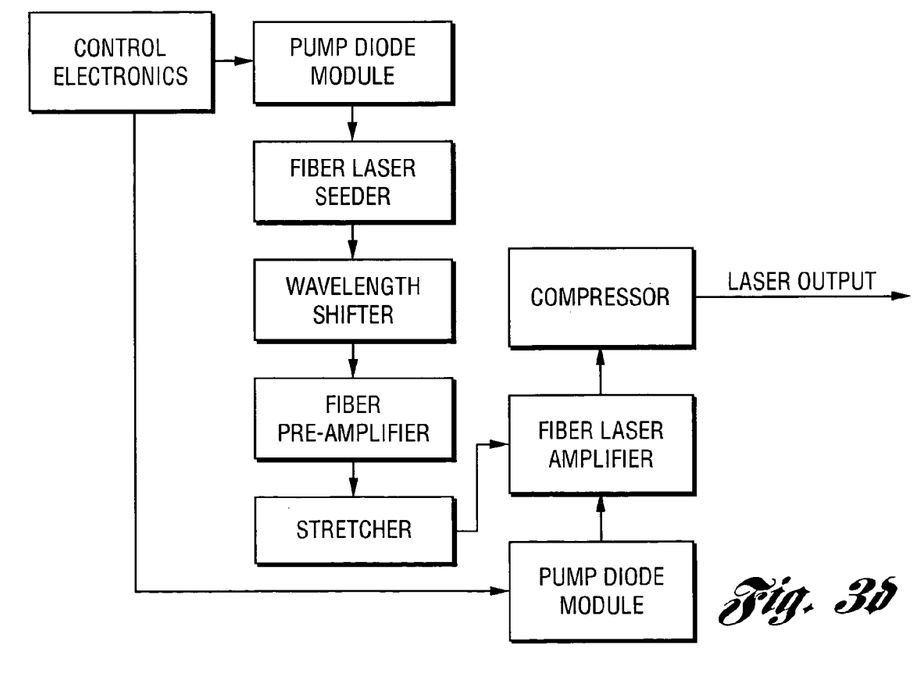
FIG. 3d is a schematic diagram of another laser configuration that can be employed in accordance with the present invention; it is an all fiber laser system.

FIG. 3d is yet another version that provides a pre-amplifier between the seed laser stage and power amplifier stage. This is necessary when the input to the amplifier needs to be at certain level in order to achieve a certain output power level. This pre-amplifier is also fiber based.

Figure 3E:
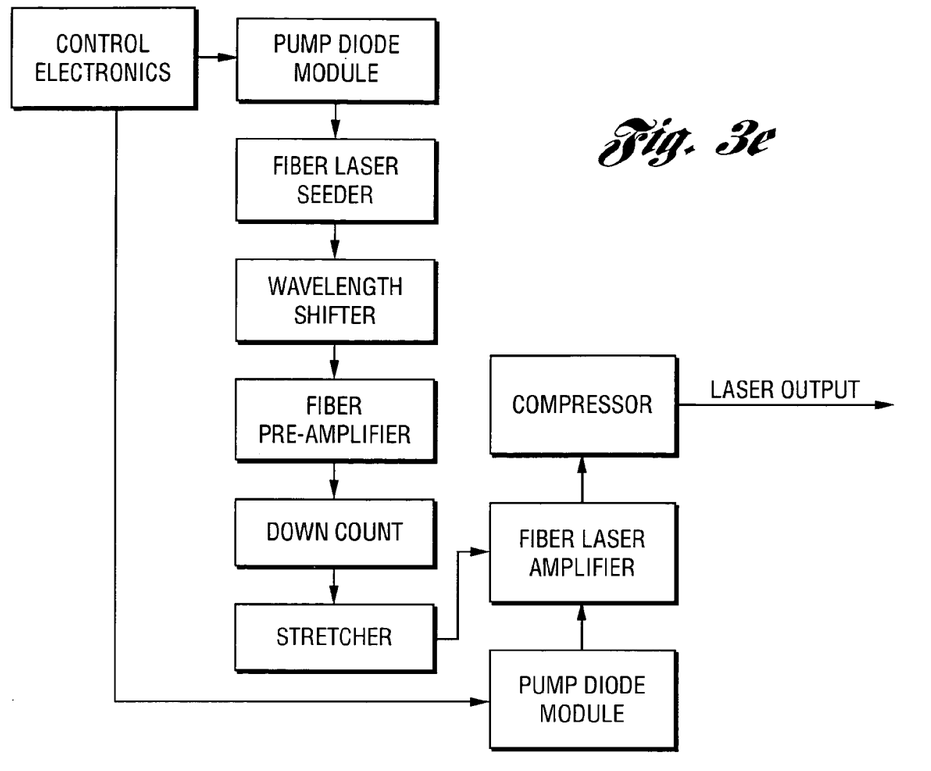
FIG. 3e is a schematic diagram of another laser configuration that can be employed in accordance with the present invention; it is an all fiber laser system.

FIG. 3e is yet another version that adds on a down-counting modulator. It is necessary when the repetition rates are different between the power amplifier and seed laser. Usually, the repetition rate from a mode locked seed laser is high, in the range of MHz. However, the repetition rate requirement for the power amplifier may be in the range of a few to hundreds of KHz. A down-counting device should be used in this case. An example of such a down-counting device can be an acoustic-optic modulator. An exemplary laser is the Femtolite and Wattlite series offered by IMRA. Datasheets are available from IMRA America. Pulses down to 100 fs with average power of 1 watt, wavelength 1.03–1.06 microns has been achieved in this Yb-fiber amplified, Femtolite-based source. Other wavelengths, e.g., 780 nm and Second Harmonic Generation of 1.03–1.06 microns, are also available from the company.

Figure 3F:
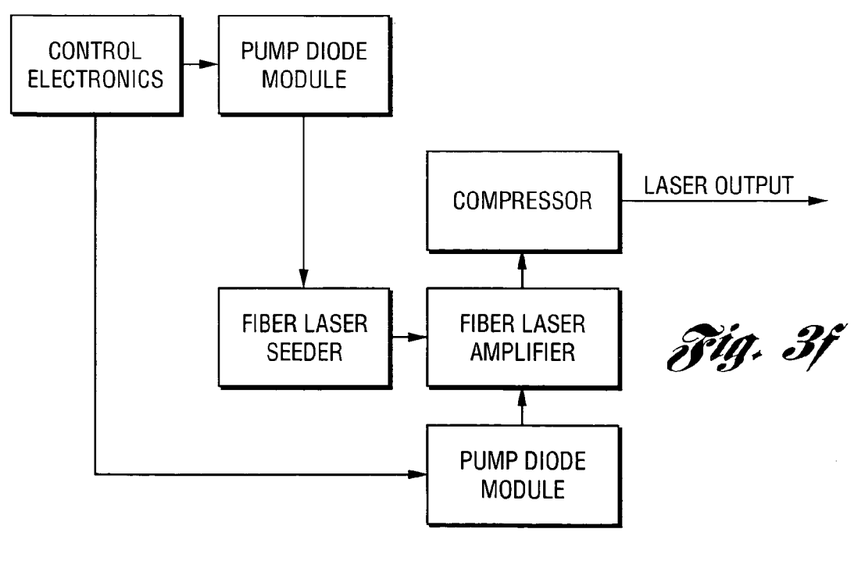
FIG. 3f is a schematic diagram of an all-fiber laser configuration that can be employed in accordance with the present invention; it uses parabolic pulse amplification (PPA) technique.
Figure 3G:
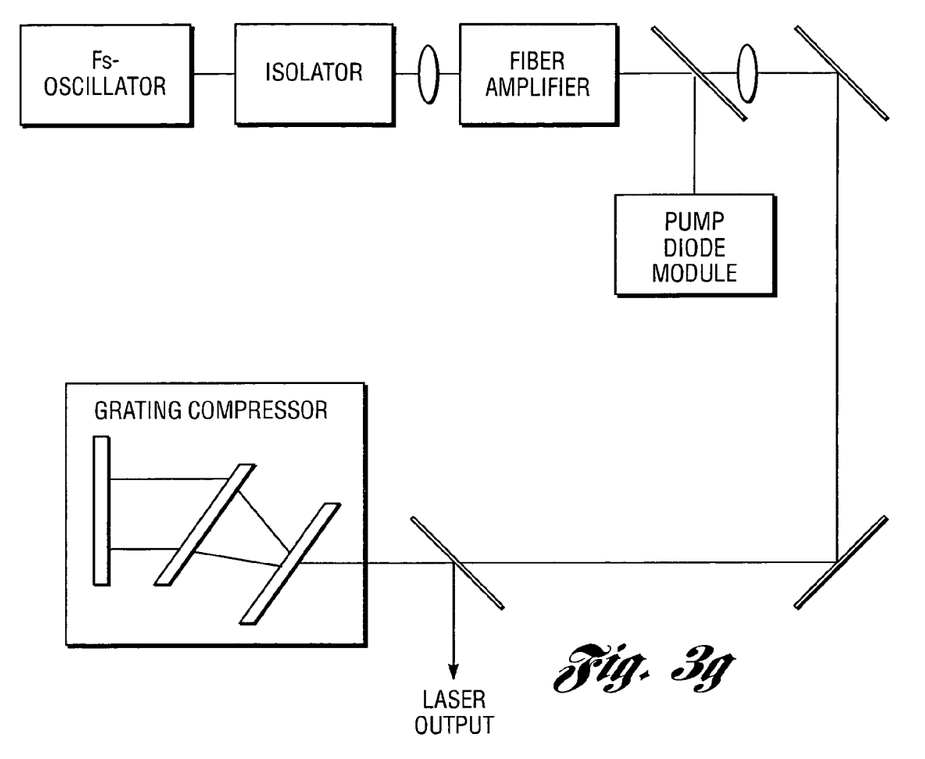
FIG. 3g is a schematic diagram of an exemplary fiber-based PPA fiber laser system.

FIGS. 3f and 3g are further examples of fiber laser configurations. These are all-fiber laser systems using a different amplification technique. A Parabolic Pulse Amplification (PPA) technique is used to amplify the pulse energy to reach the energy and power levels with the ultra short pulse width that are required to obtain the single pulse process. Direct amplification creates linearly chirped parabolic pulses by taking advantages of interplay of nonlinearity, normal dispersion and gain. Pulses then are recompressed to femto second duration at the end by a compressor. J. Limpert et al., "High Power Femto Second Fiber Laser Systems," Photonics West 2003, San Jose, Calif., Paper 4978–01 discloses performance with 10.2 watt average power, 80 fs pulse duration, at 75 MHz repetition rate by using the PPA technique.

In another reference, another amplification technique is used. It is called parametric chirped pulse amplification (PCPA), which uses a parametric amplifier pumped by a fiber-amplified microchip laser. A. Galvanauskas et al., "Parametric Chirped Pulse Microamplifier Based on Engineerable Quasi-phase-matched LiNbO3," ULTRAFAST PHENOMENA XI, SPRINGER SERIES IN CHEMICAL Physics, Vol. 63, Springer-Verlag, Berlin, 60 (1998). One of the advantages of this system is that the parametric-amplification produces very high gain (~80 db) in a single stage, thus eliminating the need for complex multistage or multi pass amplification.

Figure 4:
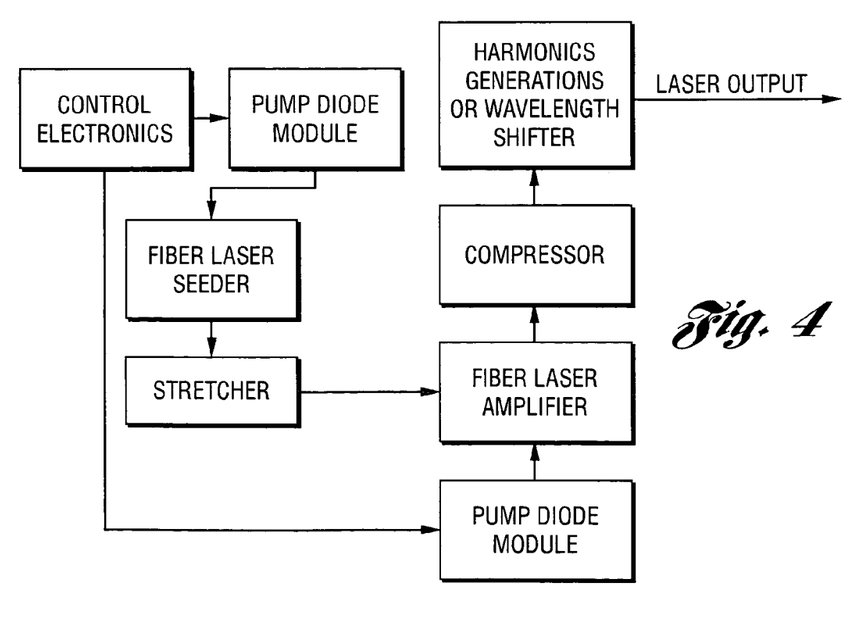
FIG. 4 is a schematic diagram of another laser configuration that can be employed in accordance with the present invention; it is an all fiber laser system.

FIG. 4 shows a schematic of another all-fiber system where harmonic generation modules or wavelength shifters are used to shift the wavelength to shorter or longer wavelength depending on the process requirement. The wavelength shifting or conversion techniques are well known in the laser community. By way of example, current web site pages from Concept Design Production illustrate various approaches for wavelength conversion systems. Also, ultra fast laser product data sheets are available from Coherent. The tunability is over a range of about 480–2300 nm.

Figure 5:
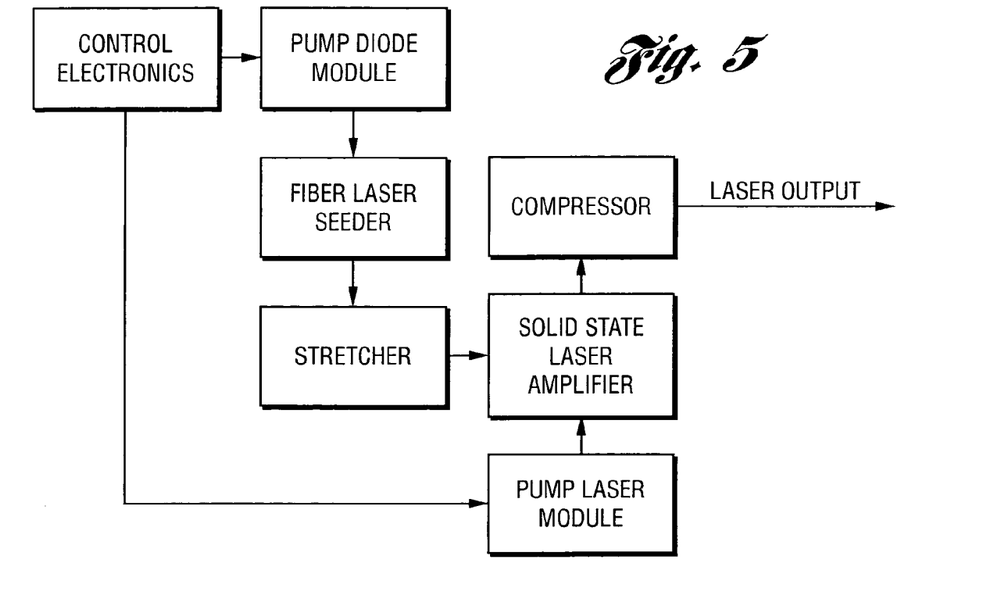
FIG. 5 is a schematic diagram of another laser configuration that can be employed in accordance with the present invention.

FIG. 5 shows a schematic diagram of another laser configuration where the seed laser is a fiber laser and the amplifier is a solid state laser. An exemplary laser is CPA-2001 by Clark-MXR. This fully-integrated commercially available system comprises a seed laser (mode-locked fiber laser), a pulse stretcher, a Ti:sapphire regenerative amplifier, a pulse compressor and a solid state pump laser. It produces 0.8 mJ at 775 nm at 1 KHz with less than 150 fs pulse width. The data sheet of CPA-2001 is available from CMXR.

In FIG. 6, the seed laser is either a fiber laser or a diode laser, and the amplifier a waveguide laser.

In FIG. 7, the seed is either a diode pumped solid-state laser or a microchip laser, and the amplifier a fiber laser.

Figure 8:
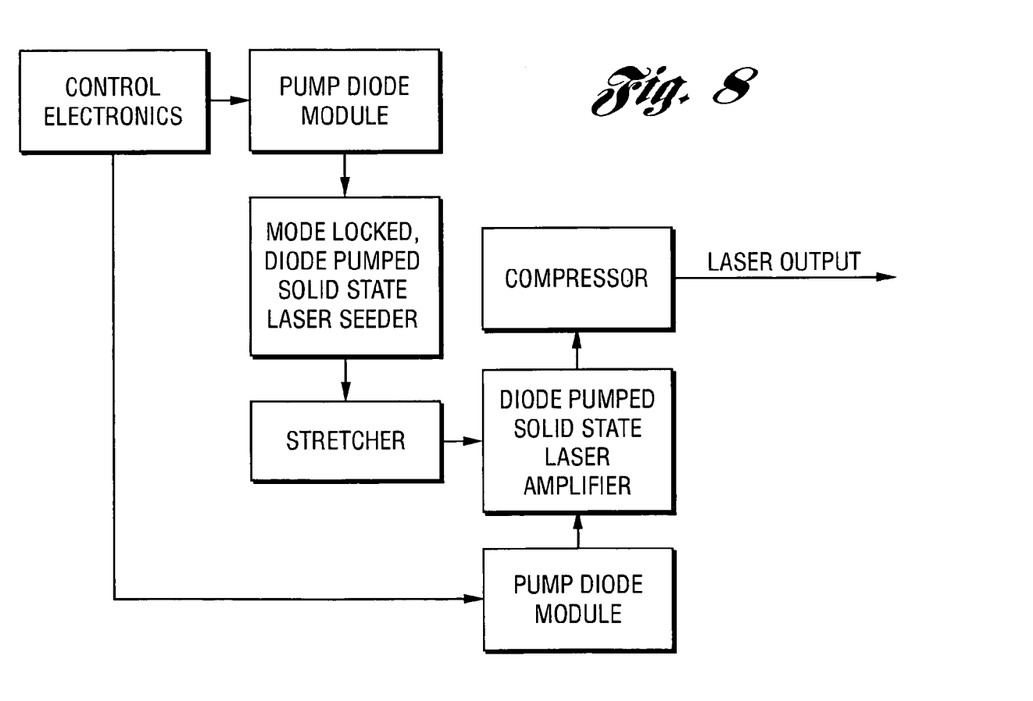
FIG. 8 is a schematic diagram of another laser configuration that can be employed in accordance with the present invention.

Yet another laser configuration is shown schematically in FIG. 8. This is an all-solid-state laser system. The seed is a mode locked, diode pumped solid-state laser and the amplifier another diode pumped solid state laser. Exemplary lasers are: For mode-lock solid state seed laser: IC-100 and SC-100 femto second Nd:glass lasers from High Q Laser Production GmbH (hereinafter, "High Q Laser"). The wavelength from this laser is 1058 nm with a pulse width of 200 fs. High Q Laser also makes Ytterbium based and Cr:LiSAF based femto second lasers which give the wavelengths at 1030–1054 nm and 850 nm, respectively. Femto second regenerative amplifiers based on Nd:glass, Ytterbium, and Cr:LiSAF by High Q Laser can deliver micro-joule energy at 100 KHz-1 MHz repetition rates. Data sheets are available from High Q Laser.

In one embodiment of a link blowing system a preferred fiber laser system will provide an output repetition rate within a range of about 5–100 KHz, and preferably about 20 KHz–100 KHz.

Various embodiments may include active or passive switched lasers. In one embodiment of a link blowing system a preferred fiber laser system will be synchronized with a beam positioner by selecting laser pulses having an exemplary repetition rate of several tens of MHz or possibly greater. The selection may be through the use of an acousto-optic modulator which is controllably switched. U.S. Pat.

No. 5,998,759 and published patent application Ser. No. 2002/0162973, both assigned to the assignee of the present invention, show the use of such a high speed switch to provide laser pulses on demand. It is to be recognized that other switches may be used or adapted for the pulse selection, for instance waveguide or other electro-optic switches. The pulse may then be amplified with a power amplifier to generate an output pulse having energy density for processing links with a single pulse.

Skilled persons will appreciate and understand other possible combinations of different types of laser sources for seed and amplifier lasers.

Memory Repair System

Figure 9:
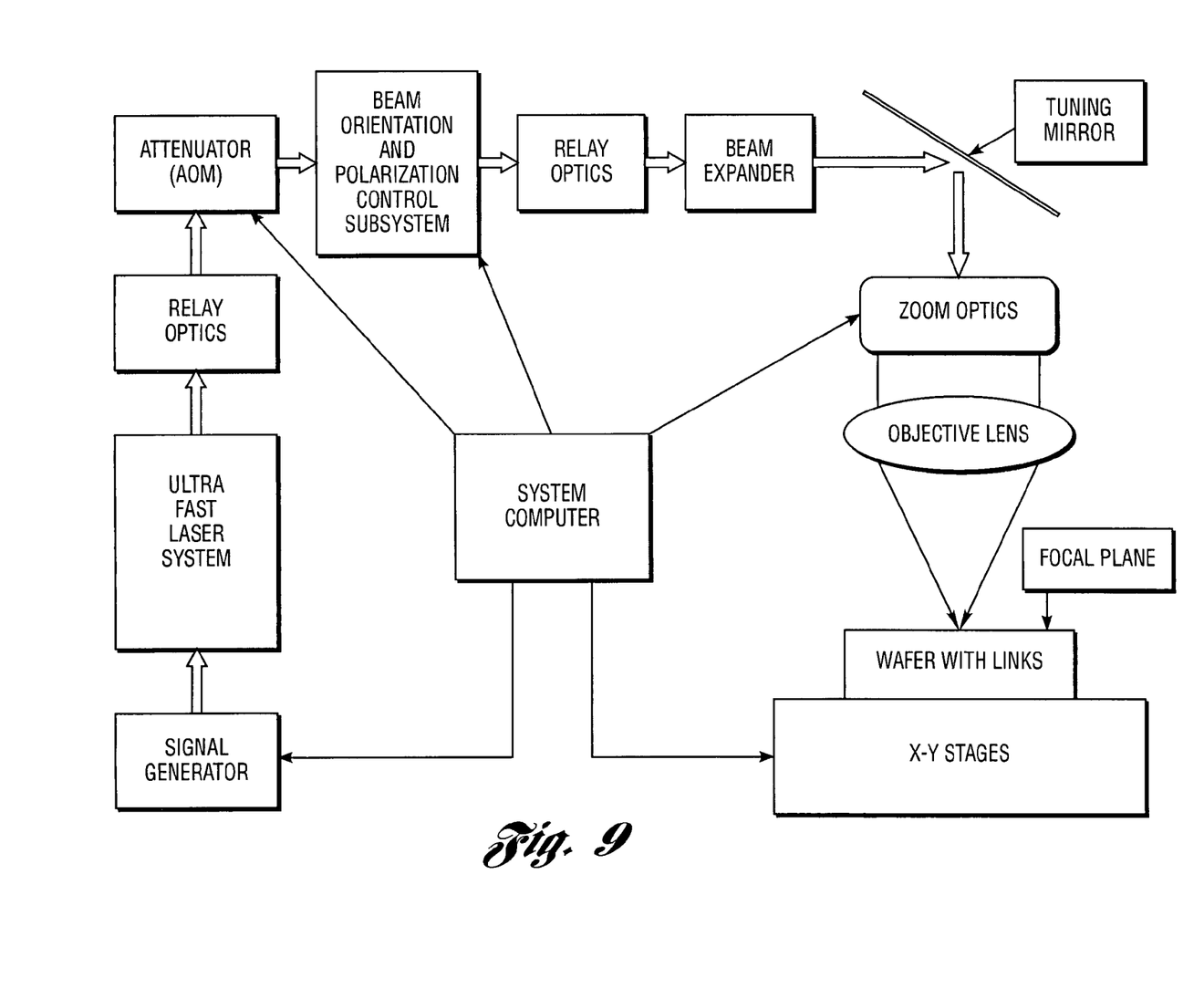
FIG. 9 is a schematic diagram of a laser memory link repair system that can be employed in accordance with the present invention.
Figure 10:
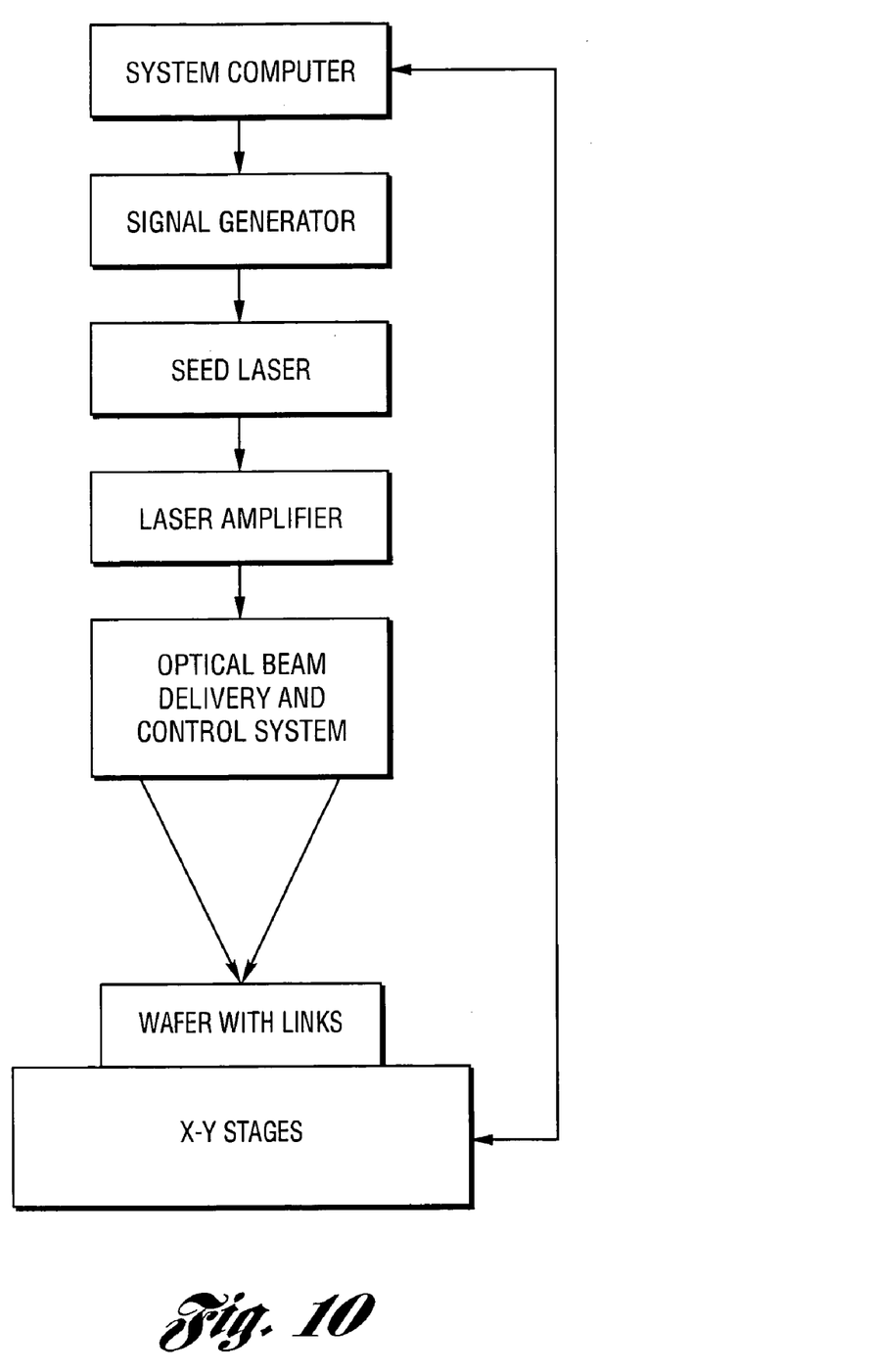
FIG. 10 is a general block diagram for laser control of a laser memory repair system that can be employed in accordance with the present invention.

Complete micromachining stations using ultrafast lasers have been developed (c.f.: "Background of the Invention", Haight, Ref. 4, Perry, Ref. 10, and Clark-MXR literature). A preferred laser memory link repair system is shown schematically in FIGS. 9 and 10. At least one embodiment of an ultrafast laser system may be integrated into the M430 series produced by the assignee of the present invention, or other micromachining systems having suitable sub-micron tolerances and performance specifications for high speed micromachining. The following list of attached patents and published applications, assigned to the assignee of the present invention, describe numerous aspects related the memory repair methods and systems:

1. U.S. Pat. No. 5,300,756, entitled "Method and System for Severing Integrated-Circuit Connection Paths by a Phase Plate Adjusted Laser Beam."
2. U.S. Pat. No. 6,144,118, entitled "High Speed Precision Positioning Apparatus."
3. U.S. Pat. No. 6,181,728, entitled "Controlling Laser Polarization."
4. U.S. Pat. No. 5,998,759, entitled "Laser Processing."
5. U.S. Pat. No. 6,281,471, entitled "Energy Efficient, Laser-Based Method and System for Processing Target Material."
6. U.S. Pat. No. 6,340,806, entitled "Energy-Efficient Method and System for Processing Target Material Using an Amplified, Wavelength-Shifted Pulse Train."
7. U.S. application Ser. No. 09/572,925, entitled "Method and System For Precisely Positioning A Waist of A Material-Processing Laser Beam To Process Microstructures Within A Laser-Processing Site," filed May 16, 2000, and published as WO 0187534 A2, December, 2001, now U.S. Pat. No. 6,483,071, division of Ser. No. 09/572,925.
8. U.S. Pat. No. 6,300,590, entitled "Laser Processing."
9. U.S. Pat. No. 6,339,604, entitled "Pulse Control in Laser Systems."
10. U.S. published patent application Ser. No. 2002/0162973, entitled "Methods and Systems for Processing a Device, Methods and Systems for Modeling Same and the Device."

While the best mode for carrying out the invention has been described in detail, those familiar with the art to which this invention relates will recognize various alternative designs and embodiments for practicing the invention.

What is claimed is:

1. A method for processing target material of a microstructure while avoiding undesirable changes to adjacent non-target material having a thermal or optical property different than the target material, the target material being characterized by a relationship of fluence breakdown threshold versus laser pulse width that exhibits a rapid and distinct change in slope at a characteristic laser pulse width, the method comprising:
generating a pulsed laser beam in which a first pulse of the beam has a pulse width equal to or less than the characteristic laser pulse width;
focusing the pulsed laser beam to obtain a focused beam; and
relatively positioning the focused beam into a spot on the target material wherein the first pulse and only the first pulse removes all of the target material while avoiding undesirable change to the adjacent non-target material.

2. The method of claim 1, wherein the microstructure is a electrically conductive, redundant memory link.

3. The method as claimed in claim 2 wherein the link is part of a semiconductor memory device having links widths pitch less than about 1.33 microns.

4. The method as claimed in claim 2, wherein the link is supported on a silicon substrate, and wherein laser wavelength is greater than about 1 $\mu$m.

5. The method as claimed in claim 4, wherein at least one absorbing material is located between the link and the substrate to prevent damage to at least one of the substrate and a link adjacent to the memory link.

6. The method as claimed in claim 5, wherein the at least one absorbing material includes a sacrificial layer of material.

7. The method as claimed in claim 5, wherein interaction of the absorbing material with the focused beam includes non-linear absorption of laser energy.

8. The method as claimed in claim 1, wherein the micro structure is a link supported on a substrate and wherein at least one sacrificial material is located between the link and the substrate.

9. The method as claimed in claim 8, wherein the substrate is a silicon substrate.

10. The method as claimed in claim 9, wherein laser wavelength is less than about 500 nm.

11. The method as claimed in claim 1, wherein the step of generating includes amplifying a seed pulse with a fiber optic amplifier.

12. The method as claimed in claim 1, wherein energy density of the focused beam at the spot is greater than about 2 Joules/cm$^2$.

13. The method as claimed in claim 12, wherein the energy density is in a range of about 25–30 Joules/cm$^2$.

14. The method as claimed in claim 1, wherein the pulse width of the first pulse is less than about 10 ps.

15. The method as claimed in claim 1, wherein the pulse width of the first pulse is less than about 150 fs.

16. The method as claimed in claim 1, wherein the spot has a diameter less than about 1.6 microns.

17. A system for processing target material of a microstructure while avoiding undesirable changes to adjacent non-target material having a thermal or optical property different than the target material, the target material being characterized by a relationship of fluence breakdown threshold versus laser pulse width that exhibits a rapid and distinct change in slope at a characteristic laser pulse width, the system comprising:
means for generating a pulsed laser beam in which a first pulse of the beam has a pulse width equal to or less than the characteristic laser pulse width;
means for focusing the pulsed laser beam to obtain a focused beam; and
means for relatively positioning the focused beam into a spot on the target material wherein the first pulse and only the first pulse removes all of the target material while avoiding undesirable change to the adjacent non-target material.

18. The system as claimed in claim 17, wherein the microstructure is an electrically conductive, redundant memory link.

19. The system as claimed in claim 18, wherein the means for relatively positioning includes:
   a positioning subsystem for relatively positioning the link and the focused beam.

20. The system as claimed in claim 18, wherein the means for generating includes:
   an oscillator to generate a source pulse;
   a pulse stretcher to stretch the source pulse to obtain a stretched pulse;
   an optical amplifier for amplifying the stretched pulse to obtain an amplified pulse; and
   a compressor for compressing the amplified pulse so as to produce the first pulse.

21. The system as claimed in claim 20, wherein the optical amplifier is a fiber optic amplifier.

22. The system as claimed in claim 20, wherein the pulse stretcher and the compressor are both gratings.

23. The system as claimed in claim 20, wherein the optical amplifier is an all-fiber parabolic pulse amplifier.

24. The system as claimed in claim 17, wherein the means for generating includes an oscillator and an optical amplifier and wherein the oscillator and the optical amplifier are both fiber-based.

25. The system as claimed in claim 24, wherein the means for generating uses FCPA.

26. The system as claimed in claim 17, wherein the means for generating uses parabolic pulse amplification.

27. The system as claimed in claim 17, wherein the means for generating uses chirped pulse amplification.

* * * * *